United States Patent
Chen

(10) Patent No.: US 8,935,558 B2
(45) Date of Patent: Jan. 13, 2015

(54) OVERCLOCKING MODULE, A COMPUTER SYSTEM AND A METHOD FOR OVERCLOCKING

(75) Inventor: Zen-Mao Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 1808 days.

(21) Appl. No.: 12/325,270

(22) Filed: Dec. 1, 2008

(65) Prior Publication Data

US 2009/0265575 A1    Oct. 22, 2009

(30) Foreign Application Priority Data

Apr. 18, 2008  (TW) ................................ 97114258 A

(51) Int. Cl.
| G06F 15/177 | (2006.01) |
| G06F 1/00 | (2006.01) |
| G06F 1/04 | (2006.01) |
| G06F 11/22 | (2006.01) |

(52) U.S. Cl.
CPC .................................. *G06F 11/2289* (2013.01)
USPC ................ 713/502; 713/500; 713/501; 713/2

(58) Field of Classification Search
USPC ......................................................... 713/502
See application file for complete search history.

(56) References Cited

U.S. PATENT DOCUMENTS

| 6,622,254 B1* | 9/2003 | Kao ............................... 713/500 |
| 7,249,275 B2* | 7/2007 | Weng et al. ................... 713/501 |
| 7,382,366 B1* | 6/2008 | Klock et al. ................... 345/213 |
| 2007/0168686 A1* | 7/2007 | Pessolano ...................... 713/500 |
| 2010/0131221 A1* | 5/2010 | Chien ............................. 702/81 |

FOREIGN PATENT DOCUMENTS

| CN | 1368684 | 9/2002 |
| CN | 1716190 | 1/2006 |
| CN | 1728044 | 2/2006 |
| CN | 1932770 | 3/2007 |
| TW | 200517825 | 6/2005 |

* cited by examiner

*Primary Examiner* — Kim Huynh
*Assistant Examiner* — Vincent Chang
(74) *Attorney, Agent, or Firm* — Jianq Chyun IP Office

(57) ABSTRACT

An overclocking module, a computer system and a method for overclocking are provided. The method is used to overclock the computer system. The overclocking module of the invention includes a timer, a monitoring unit and a control unit. The timer starts to count when the computer system is booted. The monitoring unit monitors whether the computer system performs a boot-up procedure within a period of time. The control unit adjusts an operating frequency of the computer system to overclock the computer system automatically according to the monitoring result of the monitoring unit.

14 Claims, 3 Drawing Sheets

OVERCLOCKING MODULE, A COMPUTER SYSTEM AND A METHOD FOR OVERCLOCKING

CROSS-REFERENCE TO RELATED APPLICATION

This application claims the priority benefit of Taiwan application serial no. 97114258, filed on Apr. 18, 2008. The entirety of the above-mentioned patent application is hereby incorporated by reference herein and made a part of specification.

BACKGROUND OF THE INVENTION

1. Field of the Invention

The invention relates to a computer system and, more particularly, to an overclocking module, a computer system and a method for overclocking the computer system.

2. Description of the Related Art

In a conventional computer system, a clock generator is usually disposed on a motherboard. The clock generator is used for providing different clocks for a central processing unit (CPU), a memory, other chips with different functions and buses on the motherboard. When a manufacturer sets the clock frequency used in the motherboard, considering the stability of the productions, the manufacturer sets a tolerance to a certain extent for the clock frequency. Therefore, users may perform the called overclocking to make the computer system operate normally under a higher processing speed.

In a conventional technology, the overclocking for a computer system is often completed manually. However, the overclocking is completed through adjusting the frequency, shutting down and rebooting the computer, and determining whether the computer can operate normally repeatedly, which is time-consuming. Performing these highly repeated and time-consuming actions manually are rather uneconomic.

BRIEF SUMMARY OF THE INVENTION

The invention provides an overclocking module of a computer system which automatically adjusts an operating frequency of the computer system to overclock the computer system.

The invention also provides a computer system which performs overclocking automatically.

The invention further provides a method for overclocking a computer system. The method is used to allow the computer system to perform overclocking automatically.

The invention further provides an overclocking module of the computer system, including a timer, a monitoring unit and a control unit. The timer starts to count and outputs a count value when the computer system is booted. The monitoring unit, coupled with the timer, determines whether the computer system normally performs a boot-up procedure before the count value reaches a predetermined value. If the monitoring unit determines that the computer system does not perform the boot-up procedure normally when the count value reaches the predetermined value, the state of a malfunction flag is set to be a first state. In addition, the control unit is used to adjust the operating frequency of the computer system, and the control unit coupled with the monitoring unit is used to determine whether the state of the malfunction flag is set. When the state of the malfunction flag is set to be the first state, the computer system is rebooted. When the control unit determines that the number of times of rebooting the computer system reaches a predetermined number, the current operating frequency controlling the computer system is the highest frequency for the computer system to perform the boot-up procedure normally.

In another aspect, the invention provides a computer system with an automatic overclocking function. The computer system includes a CPU, a power supply, and an overclocking module. The CPU has an operating frequency. The power supply is used to supply the power needed by the computer system in operating. The overclocking module is coupled with the CPU and the power supply, respectively. The overclocking module is used to adjust the operating frequency gradually. When the computer system cannot operate normally under the current set operating frequency, the overclocking module controls the power supply to stop supplying the power and controls the computer system to be rebooted. When the overclocking module determines that the number of times of rebooting caused by failing to operate normally reaches a predetermined number, the overclocking module controls the operating frequency to be the highest frequency for the computer system to perform the boot-up procedure normally.

The invention relates to a method which utilizes performing the boot-up procedure to adjust the operating frequency automatically to perform overclocking. Therefore, the overclocking can be completed quickly and effectively, which is timesaving, and then the method is more efficient than prior art.

These and other features and advantages of the present invention will become better understood with regard to the following description, appended claims, and accompanying drawings.

DETAILED DESCRIPTION OF THE EMBODIMENTS

Thereinafter, with reference to the related drawings, a computer system with an automatic overclocking function and a method for overclocking the computer system are illustrated according to a preferred embodiment of the invention, wherein the same elements are denoted by the same reference marks.

Figure 1:
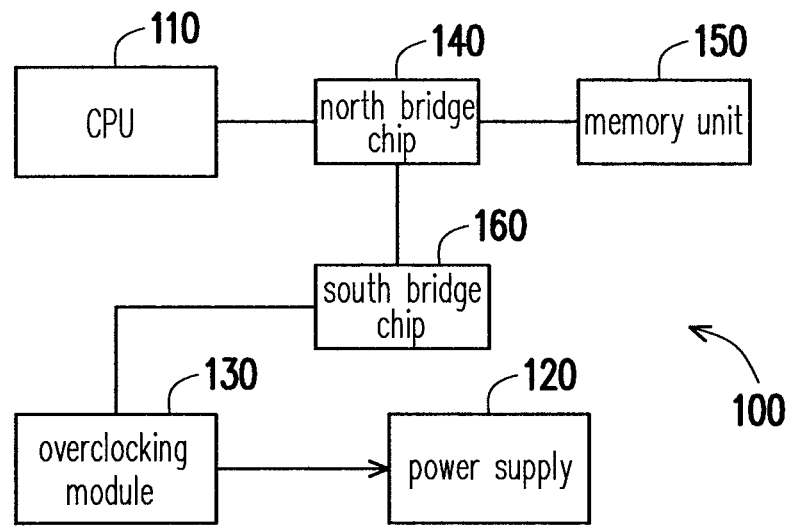
FIG. 1 is a block diagram of a computer system with an automatic overclocking function according to a preferred embodiment of the invention.

FIG. 1 is a block diagram of a computer system with an automatic overclocking function according to a preferred embodiment of the invention. The embodiment provides a computer system 100. As shown in FIG. 1, the computer system 100 includes a CPU 110, a power supply 120, an overclocking module 130, a north bridge chip 140, and a south bridge chip 160. The CPU 110 is coupled with the north bridge chip 140, and it is coupled with the south bridge chip 160 through the north bridge chip 140. The north bridge chip 140 is coupled with a memory unit 150, and the south bridge chip 160 is also coupled with the overclocking module 130. In the embodiment, the overclocking module 130 is further coupled with the power supply 120. It is well known that the power supply 120 is used to supply the power needed by the computer system 100 in operating.

The CPU 110 has an operating frequency. Generally speaking, the operating frequency is the operating frequency of the computer system 100. In the embodiment, the operating frequency of the CPU 110 is determined by the overclocking module 130.

Figure 2:
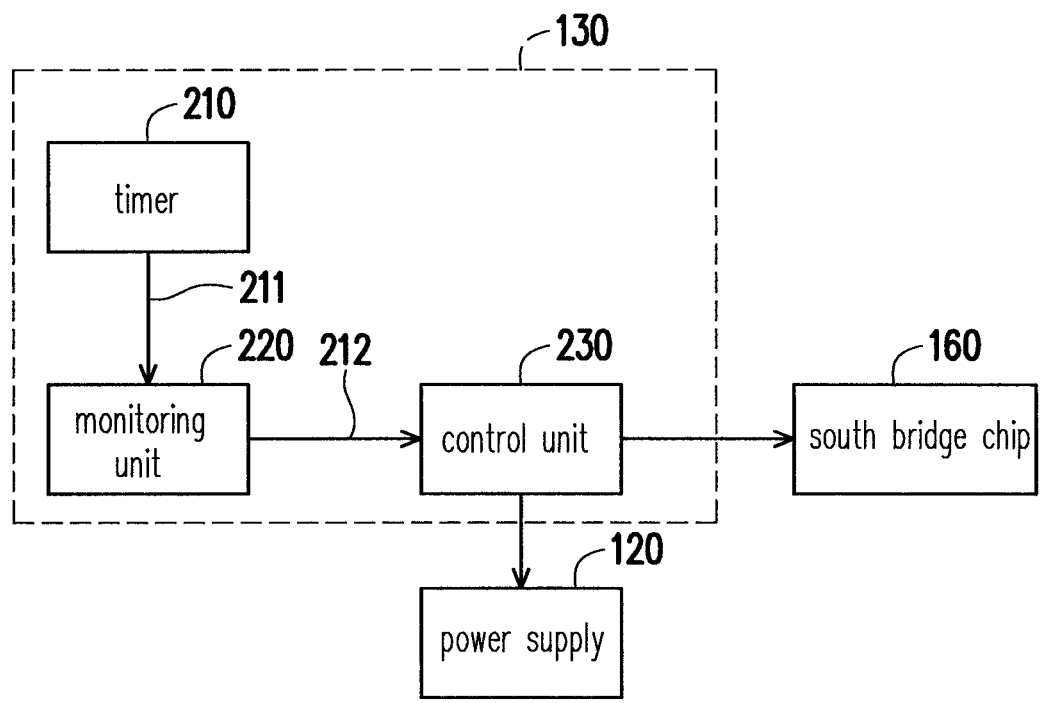
FIG. 2 is a system block diagram of an overclocking module according to a preferred embodiment of the invention.

FIG. 2 is a system block diagram of an overclocking module according to a preferred embodiment of the invention. As shown in FIG. 2, the overclocking module 130 includes a timer 210, a monitoring unit 220 and a control unit 230. The monitoring unit 220 is coupled with the timer 210 and the control unit 230 respectively, while the control unit 230 is coupled with the power supply 120 and the south bridge chip 160, respectively. In the embodiment, the control unit 230 may be a super input and output unit (super I/O unit).

As shown in FIG. 1 and FIG. 2, when the computer system 100 is booted, the timer 210 starts to count and generates a count value 211 to the monitoring unit 220. The monitoring unit 220 is used to determine whether the computer system 100 normally performs a boot-up procedure before the count value 211 reaches a predetermined value. In the embodiment, the boot-up procedure includes some procedures for verifying whether the computer system 100 can operate normally, and the procedure includes the action such as performing a read and write test on a memory or hardware, which is called as power-on self-test (POST).

When the monitoring unit 220 determines that the computer system 100 normally performs the boot-up procedure before the count value 211 reaches the predetermined value, the computer system can operate normally under this frequency. At that moment, the control unit 230 controls the computer system 100 to reboot (the time of rebooting is not counted), and a predetermined frequency increment value is added to the current operating frequency of the computer system 100 to obtain a new operating frequency of the computer system 100. In some embodiments, the monitoring unit 220 also can reset the timer 210 to make the count value be zero.

When the monitoring unit 220 determines that the computer system 100 does not normally perform the boot-up procedure before the count value 211 reaches the predetermined value, the computer system 100 may crash. Then, the monitoring unit 220 can set the state of a malfunction flag 212 to be a first state, and send it to the control unit 230. When the state of the malfunction flag 212 is set to be the first state, the control unit 230 can make the computer system 100 reboot according to the previous set parameters (such as the operating frequency before adjusting), and the time of rebooting is counted.

If the computer system 100 cannot normally perform the boot-up procedure in the predetermined value, it reboots. When the number of times of rebooting does not reach a predetermined number (predetermined number of times), the control unit 230 adjusts a plurality of operational parameters of the computer system 100 other than the operating frequency before the computer system 100 is rebooted. The operational parameters such as the operating voltage of the CPU, the south bridge chip, the memory unit or the north bridge chip are adjusted.

When the count number reaches a predetermined number, the control unit 230 sets the operating frequency of the computer system 100 to be the highest frequency for the computer system 100 to perform the boot-up procedure normally last time. However, in some embodiments, the control unit 230 may set the final operating frequency of the computer system 100 to be a frequency slightly lower than the highest frequency for the computer system 100 to perform the boot-up procedure normally last time, which ensures that the computer system 100 can operate normally after loading the operation system.

Besides the frequency, the system voltage is also a factor which influences the normal operation of the computer system. That is, when an electrical device works under an operating frequency which is higher than the normal, generally, higher system voltage is needed. Therefore, when the computer system 100 cannot normally performs the boot-up procedure, and then the control unit 230 needs to adjust the operational parameters, it may adjust the operating voltage of the CPU (for example the CPU 110), the south bridge chip, the north bridge chip and (or) the memory unit of the computer system.

Figure 3:
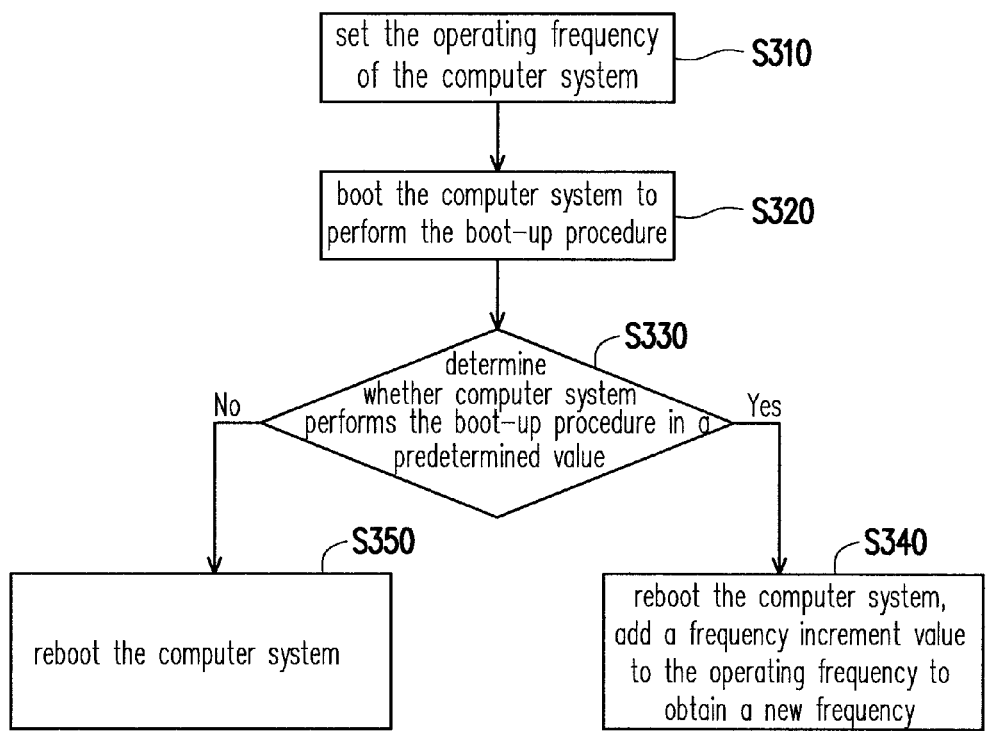
FIG. 3 is a flowchart of a method for overclocking a computer system according to a preferred embodiment of the invention.

FIG. 3 is a flowchart of a method for overclocking a computer system according to a preferred embodiment of the invention. As shown in FIG. 3, in the embodiment, when the users start an automatic overclocking function of a computer system, the operating frequency of the computer system is set as shown in step S310. The operating frequency set herein is a safe operating frequency. That is, the computer system can operate normally under the operating frequency which is regarded as the initial frequency of the overclocking.

Afterward, as stated in step S320 the computer system is booted up to perform the boot-up procedure. Then, step S330 is performed. That is, whether the computer system performs the boot-up procedure successfully in a predetermined value under a set operating frequency is determined. In other words, whether the computer system can operate normally under a new operating frequency is determined. The predetermined value is generally set to be a period of time which is enough for the computer system to complete the boot-up procedure normally.

When the computer system cannot operate normally in the predetermined value (that is "no" shown in step S330), according to step S350, the computer system is rebooted. When the computer system normally performs the boot-up procedure in the predetermined value (that is "yes" shown in step S330), according to step S340, the computer system is rebooted, a frequency increment value is added to the operating frequency to obtain a new operating frequency. In some embodiments, when the computer system can normally perform the boot-up procedure in the predetermined value, the current operating frequency of the computer system is stored. Thereby, when the computer system cannot operate normally after the operating frequency is adjusted next time, the stored operating frequency is used to be the final operating frequency.

Figure 4:
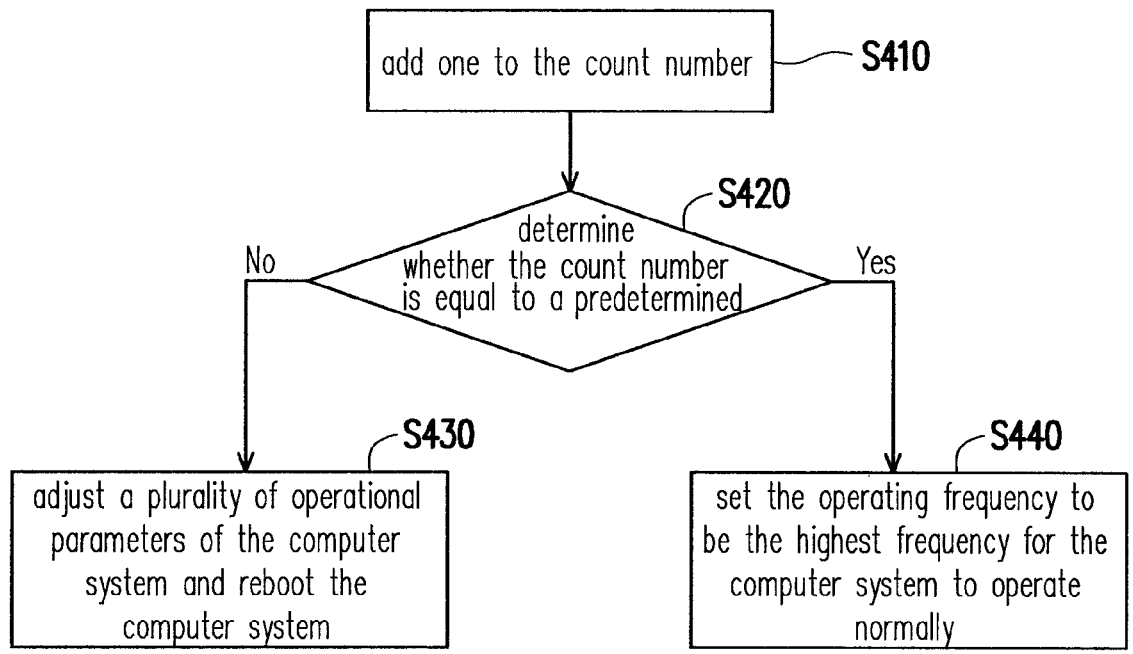
FIG. 4 is a flowchart of rebooting when the computer system cannot operate normally according to a preferred embodiment of the invention.

FIG. 4 is a flowchart of rebooting when the computer system cannot operate normally, according to a preferred embodiment of the invention. As shown in FIG. 4, when computer system performs reboot procedure according to step S350, step S410 is performed. That is, the count number is added by one, and according to step S420, whether the count number is equal to a predetermined number is determined.

When the determining result is that the count number is not equal to the predetermined number (that is "no" shown in step S420), step S430 is performed in the embodiment. That is, a plurality of operational parameters of the computer system are adjusted. For example, the operating voltage of a few peripheral systems (such as a south bridge chip, a north bridge chip and a memory unit) is adjusted, and the computer system is rebooted up. When the count number is equal to the predetermined number (that is "yes" shown in the step S420), that is, the number of times of failing to overclock reaches the maximum, according to step S440, the operating frequency of the computer system is set to be the highest frequency for the computer system to operate normally last time.

Figure 5:
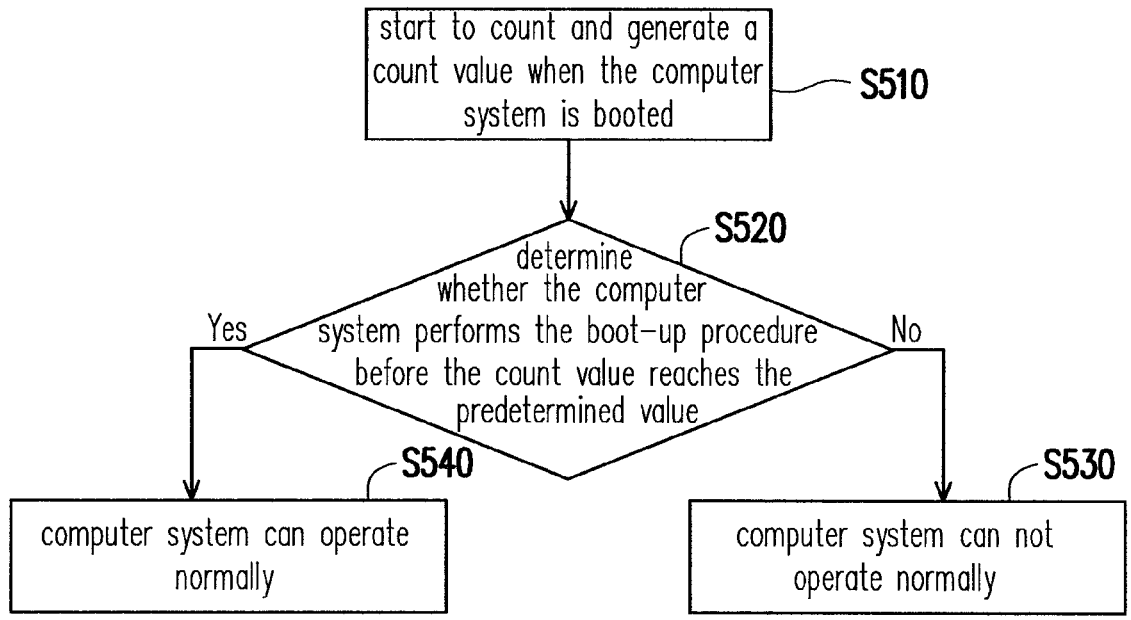
FIG. 5 is a flowchart of determining whether a computer system can operate normally in a predetermined value according to a preferred embodiment of the invention.

FIG. 5 is a flowchart of a method for determining whether a computer system can operate normally in a predetermined value according to a preferred embodiment of the invention. As shown in FIG. 5, when the computer system is booted up, the timer starts to count and generates a count value according to step S510. The count value represents the passed time after the computer system is booted up. Furthermore, step S520 is to determine whether the computer system performs the boot-up procedure normally before the count value reaches the predetermined value.

When the computer system normally performs the boot-up procedure before the count value reaches the predetermined value (that is "yes" shown in the step S520), the determining result is that the computer system can operate normally, as shown in step S540. When the computer system does not normally perform the boot-up procedure before the count value reaches the predetermined value (that is "no" shown in the step S520), according to the step S530, the determining result is that the computer system cannot operate normally.

To sum up, the invention at least includes the advantages hereinbelow.

First, the automatic overclocking function without manpower in the process of operating reduces the consumption of manpower.

Second, the overclocking may be performed differently according to the demand of a user by setting a predetermined value.

Third, the computer system can obtain a higher operating frequency by adjusting a plurality of operating parameters other than operating frequency to bring ability of the computer system into play.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An overclocking module of a computer system, comprising:
   a timer which starts counting at the boot up of the computer system and outputs a count value;
   a monitoring unit, coupled with the timer, for determining whether the computer system performs a boot-up procedure before the count value reaches a predetermined value, and setting a state of a malfunction flag when the count value reaches a predetermined value; and
   a control unit, coupled with the monitoring unit, for adjusting an operating frequency of the computer system, wherein the control unit determines whether to reboot the computer system according to the setting of state of the malfunction flag and counts a number of times of rebooting, and when the number of times of rebooting reaches a predetermined number, the operating frequency of the computer system is set to a highest frequency of the computer system to perform the boot-up procedure normally,
   wherein when the state of the malfunction flag is set to be a first state, while the number of times of rebooting the computer system does not reach the predetermined number, the control unit further adjusts a plurality of operational parameters of the computer system other than the operating frequency before rebooting the computer system.

2. The overclocking module according to claim 1, wherein the operational parameters comprise an operating voltage of a CPU, an operating voltage of a south bridge chip, an operating voltage of a north bridge chip or an operating voltage of a memory unit in the computer system.

3. The overclocking module according to claim 1, wherein when the computer system performs the boot-up procedure before the count value reaches the predetermined value, the control unit reboots the computer system and adds a frequency increment value to a current operating frequency of the computer system to obtain a new operating frequency of the computer system.

4. The overclocking module according to claim 1, wherein when the monitoring unit determines that the computer system performs the boot-up procedure before the count value reaches the predetermined value, the timer is reset to make the count value be zero.

5. A computer system, comprising:
   a CPU with an operating frequency;
   a power supply providing power needed by the computer system in operating; and
   an overclocking module, respectively coupled with the CPU and the power supply, for adjusting the operating frequency of the CPU gradually, wherein when the computer system cannot operate normally under a current set operating frequency, the overclocking module controls the power supply to stop supplying the power needed by the CPU to reboot the computer system, and when the overclocking module determines that a number of times of rebooting, caused by failing to operate normally, of the computer system reaches a predetermined number, the overclocking module controls the operating frequency be set to a highest operating frequency for the computer system to perform a boot-up procedure normally, and when the number of times of rebooting the computer system does not reach the predetermined number, the overclocking module further adjusts a plurality of operational parameters of the computer system other than the operating frequency before rebooting the computer system.

6. The computer system according to claim 5, wherein the overclocking module comprises:
   a timer which starts counting at the boot up of the computer system and outputs a count value;
   a monitoring unit, coupled with the timer and the CPU, for determining whether the CPU performs a boot-up procedure before the count value reaches the predetermined value, and setting a malfunction flag to be a first state when the monitoring unit determines that the CPU does not perform the boot-up procedure before the count value reaches the predetermined value; and
   a control unit, coupled with the monitoring unit and the power supply, for adjusting the operating frequency of the CPU and determining whether the state of the malfunction flag is set, wherein when the state of the malfunction flag is set to be the first state, the control unit controls the power supply to stop supplying the power and controls the computer system to be rebooted, and when the control unit determines that the number of times of rebooting caused by setting the malfunction flag to be the first state reaches the predetermined number, the control unit controls the operating frequency of the CPU to be set to a highest operating frequency for the computer system to perform the boot-up procedure normally.

7. The computer system according to claim 5, further comprising:
a north bridge chip coupled with the CPU;
a memory unit coupled with the north bridge chip; and
a south bridge chip respectively coupled with the north bridge chip and the overclocking module.

8. The computer system according to claim 7, wherein when the computer system cannot perform the boot-up procedure normally in the predetermined value, the overclocking module adjusts the operating voltage of at least one of the CPU, the north bridge chip, the south bridge chip and the memory unit.

9. The computer system according to claim 5, wherein when the computer system normally performs the boot-up procedure before the count value reaches the predetermined value, the control unit controls the computer system to be rebooted and adds a frequency increment value to the current operating frequency to obtain a new operating frequency.

10. A method for overclocking a computer system, comprising the steps of:
setting an operating frequency of the computer system;
booting the computer system to perform a boot-up procedure;
controlling the computer system to be rebooted when the computer system cannot operate normally under the operating frequency set;
when the computer system normally performs the boot-up procedure in a predetermined value, controlling the computer system to be rebooted and adding a frequency increment value to the operating frequency to obtain a new operating frequency;
adding one to a count number when the computer system is determined to fail to operate normally;
determining whether the count number is equal to a predetermined number;
when the count number is not equal to the predetermined number, adjusting a plurality of operational parameters of the computer system and rebooting the computer system; and
when the count number is equal to the predetermined number, setting the operating frequency of the computer system as a highest frequency for the computer system to operate normally.

11. The method for overclocking according to claim 10, wherein the operational parameters comprise an operating voltage of a CPU, a north bridge chip, a south bridge chip, or a memory unit of the computer system.

12. The method for overclocking according to claim 10, wherein the step of determining whether the computer system cannot operate normally comprises the steps of:
when computer system is booted up, starting to count and generating a count value;
checking whether the computer system performs the boot-up procedure before the count value reaches the predetermined value;
when the computer system performs the boot-up procedure before the count value reaches the predetermined value, determining that the computer system can operate normally; and
when the computer system does not perform the boot-up procedure before the count value reaches the predetermined value, determining that the computer system cannot operate normally.

13. The method for overclocking according to claim 12, wherein when the computer system performs the boot-up procedure before the count value reaches the predetermined value, the count value is set to be zero.

14. The method for overclocking according to claim 13, further comprising the steps of storing the new operating frequency when the new operating frequency is obtained, and setting the operating frequency of the computer system according to the stored operating frequency when the computer system is rebooted for failing to operate normally.

* * * * *